UNITED STATES PATENT OFFICE.

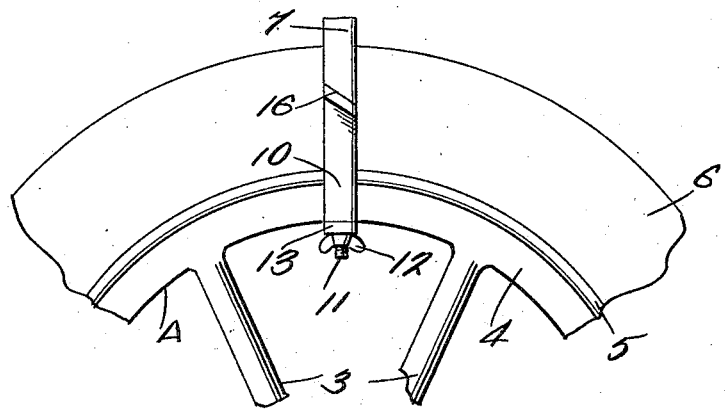
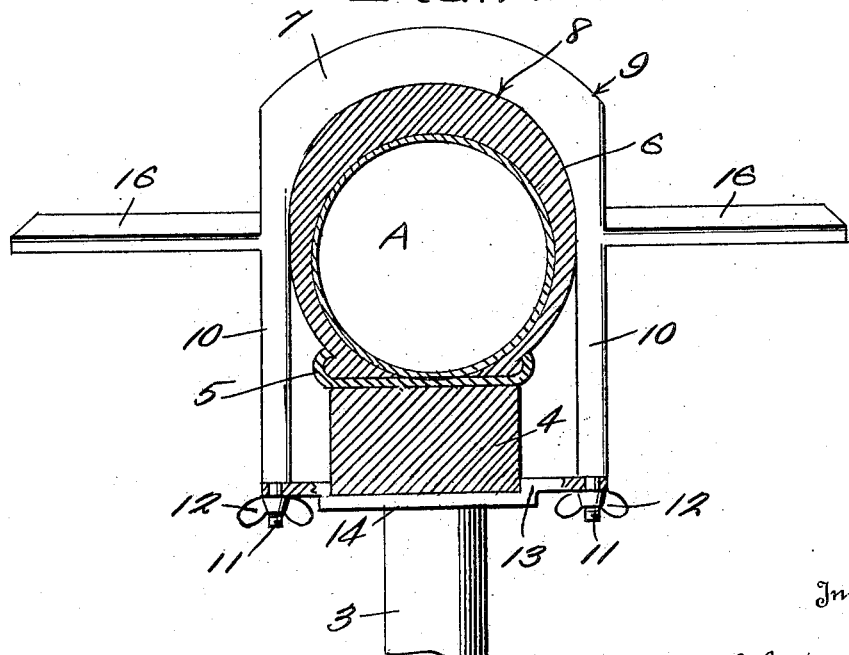

HERMAN B. STINSON, OF NORMAN, OKLAHOMA.

EMERGENCY-SPUR FOR VEHICLE-WHEELS.

1,397,186. Specification of Letters Patent. Patented Nov. 15, 1921.

Application filed June 15, 1920. Serial No. 389,135.

*To all whom it may concern:*

Be it known that I, HERMAN B. STINSON, a citizen of the United States, residing at Norman, in the county of Cleveland and State of Oklahoma, have invented certain new and useful Improvements in an Emergency-Spur for Vehicle-Wheels, of which the following is a specification.

My invention relates to an emergency spur or traction hoop for vehicle wheels.

An aim is to provide a simple, inexpensive, detachable article for the purpose stated which may be fastened to the wheel, whether or not it is equipped with a regular or "oversize" tire. It is particularly applicable for use on wheels having non-skid chains when said chains fail to furnish the necessary traction to enable the vehicle to which the wheel is attached, to travel out of mud in which it may be stalled.

With the above and additional objects such as will hereinafter appear, in view, the invention has been embodied in one preferred form as illustrated in accompanying drawings and described hereinafter.

In said drawings:—

Figure 1 is a side view of the improvement shown in connection with a fragment of a vehicle wheel, and Fig. 2 is a transverse section of a fragment of a vehicle wheel and tire with my improvement attached thereto.

Referring specifically to the drawings, a conventional vehicle wheel is shown at A of which 3 are the spokes, 4 the felly, 5 the rim, and 6 a pneumatic tire.

My improved hoop is generally of U-shape, having a bridge or arch 7 provided with an inner arcuate wall 8 substantially conforming to the shape of the tire, and an outer, preferably arcuate wall 9 to engage the road bed or mud. Integral with and depending from the arch 7, on opposite sides of the tire and in relative close relation therewith are arms 10 which terminate in reduced shanks or bolts 11 on which wing or other nuts 12 may screw. Extending under the felly 4 and against the same is a removable fastening bar 13, provided with openings adjacent its ends through which the bolts 11 pass and under which the nuts 12 engage.

It will be noticed that the felly is seated within a socket 14, similar in shape, and formed from the bar 13, to prevent lateral or sidewise movement of the improved device.

In additional to the traction obtained by the bridge or arch 7, traction may also be obtained from each side of the device through the provision of wings or blades 16. These wings may be integral with the arms 10 and preferably inclined or angularly disposed as shown.

The material used in the manufacture of the device is preferably a suitable metal as will be understood, but of course any suitable material which will stand the wear and strains to which a device of this kind is subjected may be used.

In use, when the vehicle or automobile is stalled, my improved device may be applied to one of the wheels or a number of the wheels may each be equipped with one of them, as desired. It is obvious, that in applying the device, the nuts 12 and bar 13 are detached from the arm 10, after which the arms 10 are placed over the tire into the position shown in the drawings, with the arch 7 in contact therewith. Later, the bar 13 is positioned with the socket 15 fitting the felly 4 and then the nuts 12 are applied to fasten the bar in place and the device to the wheel. As the wheel turns the required traction will be afforded by the engagement of the arch 7 and wings 16 with the soil or road and the action is assisted by the angular disposition of the wings 16.

Since merely one preferred embodiment has been illustrated and described, it is to be understood that changes in the detail of construction may be resorted to within the spirit and scope as defined by the appended claim.

I claim:—

A mud shoe for vehicle wheels comprising an arched traction member, parallel arms formed integral with and depending from the sides of said member, angularly disposed blades formed integral with said arms and extending laterally therefrom, and a fastening bar connecting the lower ends of the arms.

In testimony whereof, I have affixed my signature in the presence of two witnesses.

HERMAN B. STINSON.

Witnesses:
E. A. IRVINE,
J. G. WILSON.